Oct. 16, 1928.
T. O. MOFFIT ET AL
1,687,504
PRECISION BASING MACHINE FOR INCANDESCENT LAMPS AND SIMILAR ARTICLES
Original Filed Feb. 19, 1926   3 Sheets-Sheet 1
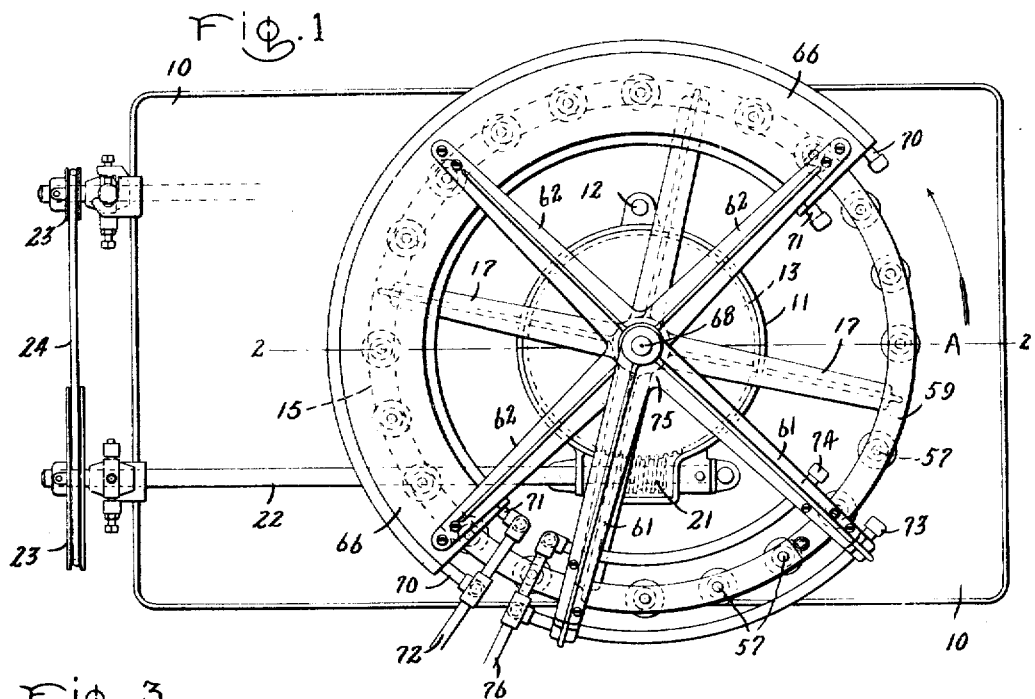
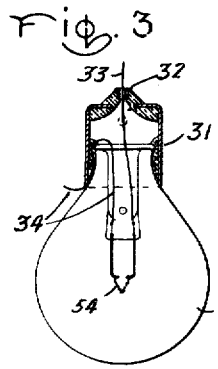
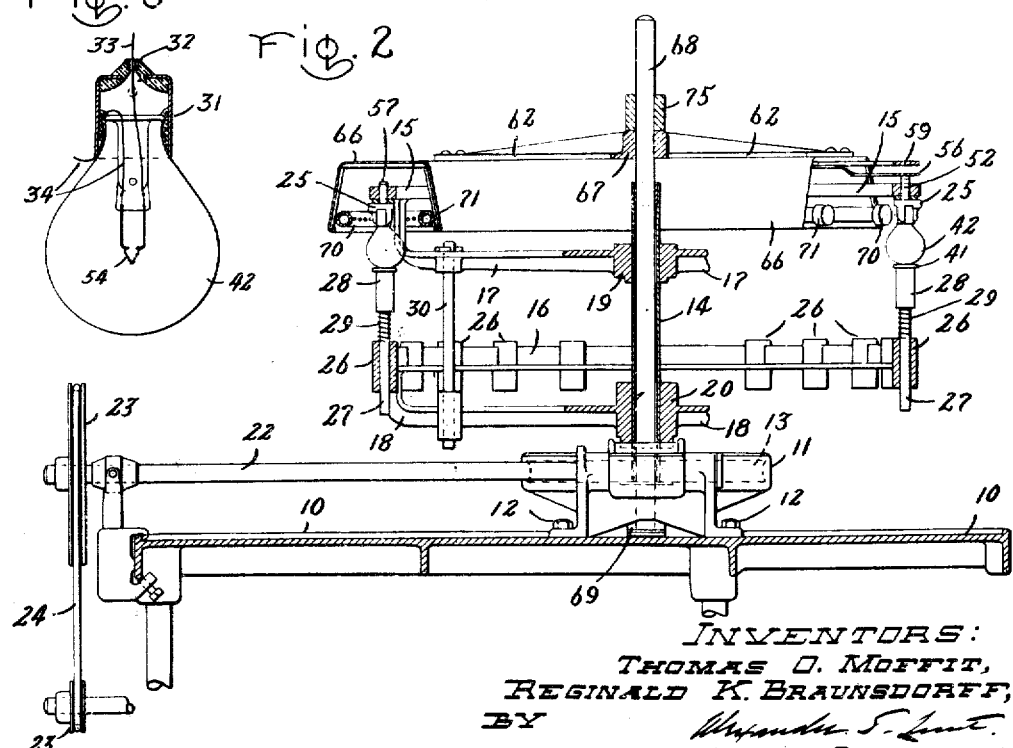
INVENTORS:
THOMAS O. MOFFIT,
REGINALD K. BRAUNSDORFF,
BY
THEIR ATTORNEY.

Oct. 16, 1928. 1,687,504
T. O. MOFFIT ET AL
PRECISION BASING MACHINE FOR INCANDESCENT LAMPS AND SIMILAR ARTICLES
Original Filed Feb. 19, 1926 3 Sheets-Sheet 2
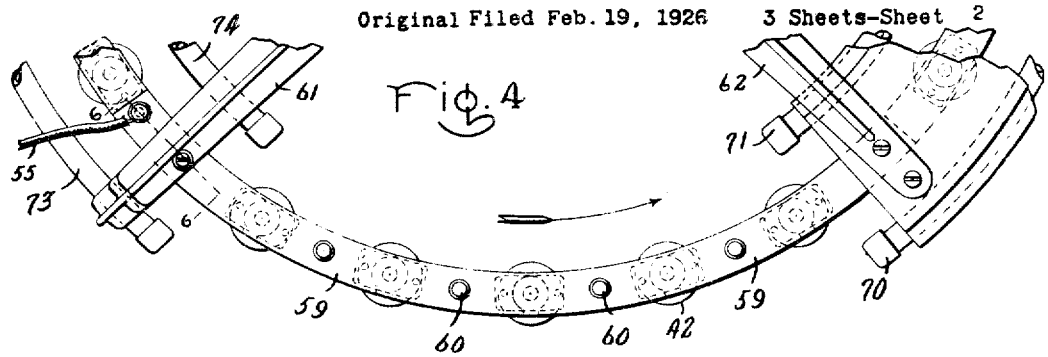
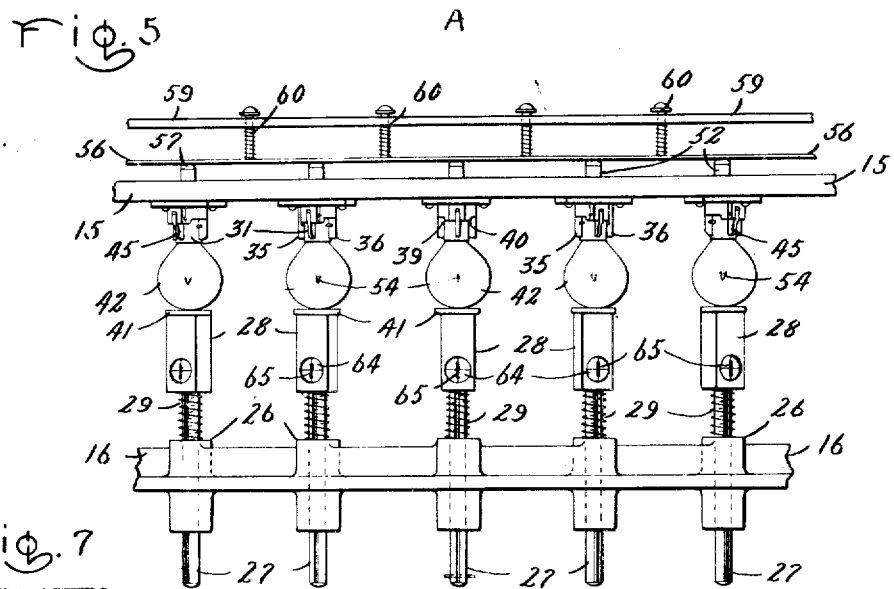
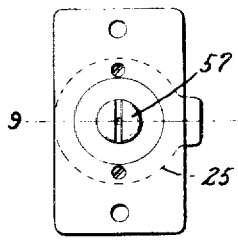
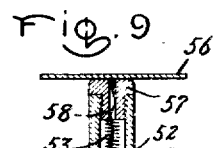
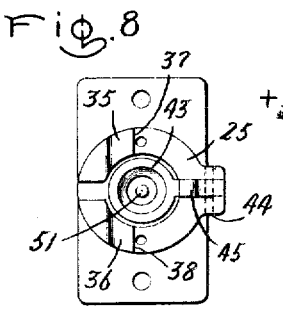
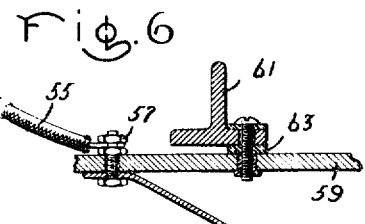
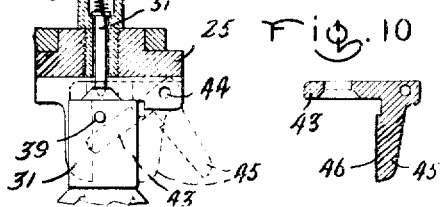
INVENTORS:
THOMAS O. MOFFIT,
REGINALD K. BRAUNSDORFF,
BY
THEIR ATTORNEY.

Oct. 16, 1928.  1,687,504
T. O. MOFFIT ET AL
PRECISION BASING MACHINE FOR INCANDESCENT LAMPS AND SIMILAR ARTICLES
Original Filed Feb. 19, 1926   3 Sheets-Sheet 3
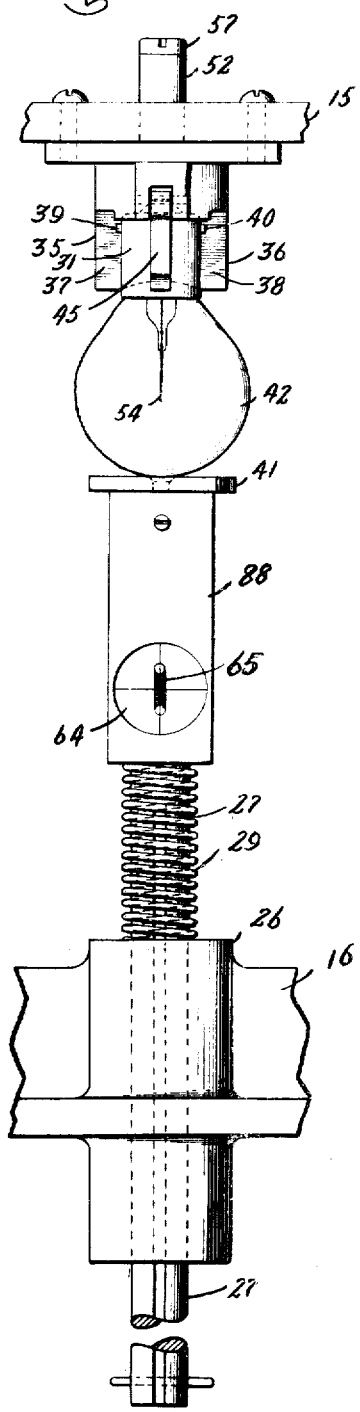
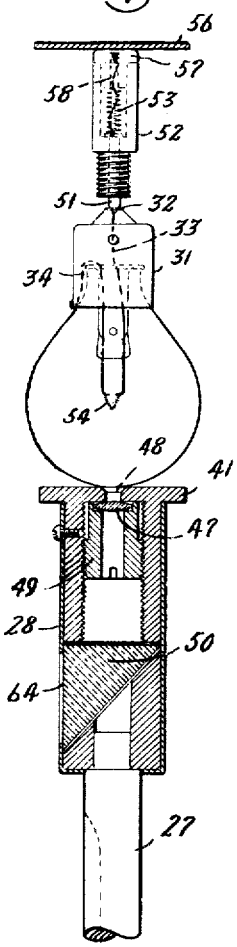
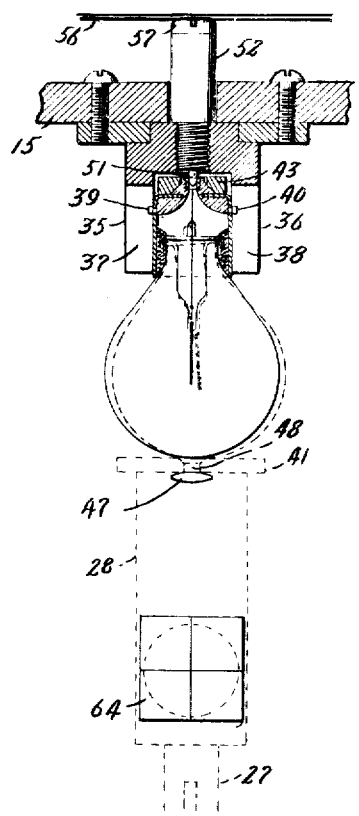
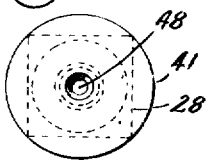
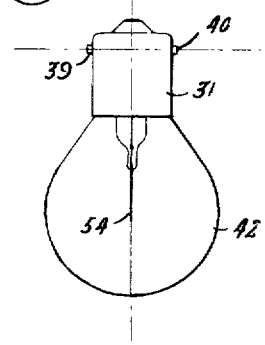
INVENTORS:
THOMAS O. MOFFIT,
REGINALD K. BRAUNSDORFF,
BY
THEIR ATTORNEY Patented Oct. 16, 1928.

1,687,504

UNITED STATES PATENT OFFICE.

THOMAS O. MOFFIT, OF CHICAGO, ILLINOIS, AND REGINALD K. BRAUNSDORFF, OF NEWARK, NEW JERSEY, ASSIGNORS TO GENERAL ELECTRIC COMPANY, A CORPORATION OF NEW YORK.

PRECISION-BASING MACHINE FOR INCANDESCENT LAMPS AND SIMILAR ARTICLES.

Application filed February 19, 1926, Serial No. 89,488. Renewed October 18, 1927.

Our invention relates to machinery for use in making incandescent lamps and similar electrical devices comprising a filament or other translating body enclosed in a transparent bulb or other container. Such devices ordinarily comprise a metallic base which is united to the container and to which are connected conductors leading within the container to the filament or other translating body. It has been found desirable for certain purposes to construct the lamp or other device so that the filament or other translating body has a definite relation to the base. This allows the mounting of the device in accessory devices so that the translating body has a definite relation to a reflector or other element coacting therewith. The object of our invention is to provide an improved apparatus for securing a desired definite relation between translating body and base.

In the manufacture of electric incandescent lamp for projection purposes, as, for instance, miniature lamps used in headlamps for vehicles, it is desirable that the more or less concentrated filament or filaments of the lamp be accurately positioned and aligned in the bulb in order that in use the filament or filaments will be correctly located with reference to the focal point of the reflector. One method of accomplishing this is in the basing operation, the base being fixed and the bulb position adjusted to bring the filament in proper relation to the base. This is the method which we follow.

Our invention is applied to a lamp basing machine of a well-known type comprising a movable carrier provided with a series of lamp assembly holders and a heating means for hardening the cement which unites the base to the bulb. A convenient means is provided for checking the position of the filament with reference to the base, preferably immediately after the lamp assembly has been inserted in the holder and, at any rate, in time so that the operator may adjust it before it reaches the aforesaid heating means. We prefer to use an optical checking means for this purpose and the preferred form of our invention comprises a very simple and convenient combination of such means with the various lamp holders.

More specifically, we provide a machine comprising a pair of continuously rotating turrets each carrying a plurality of holders and heads, each adapted to receive and support a lamp base and a bulb which are to be united. An operator properly assembles each base and bulb prior to placing them on the machine after which the lamp is lighted and an end-on projection of the filament image is reflected on a screen located directly beneath the lamp and contained in each of the heads which support the bulb. The screen is provided with means which indicate to the operator the position of the filament, thus enabling her to adjust the lamp bulb until its filament is in the desired position. After a lamp has been accurately adjusted, it is carried through a heater where the base is firmly cemented to the bulb.

Our invention will be more clearly understood by referring to the accompanying drawings in which Fig. 1 is a top plan view of our improved basing machine; Fig. 2 is a vertical section along the line 2—2 of Fig. 1; Fig. 3 is an assembled lamp partially in section; Fig. 4 is an enlarged plan of a portion of our machine; Fig. 5 is an elevation thereof; Fig. 6 is an enlarged fragmentary section along the line 6—6 of Fig. 4; Fig. 7 is a top plan of a lamp base holding chuck; Fig. 8 is a bottom plan thereof; Fig. 9 is a vertical section along the line 9—9 of Fig. 7; Fig. 10 is a vertical section through one of the lamp base holding chuck jaws; Fig. 11 is an enlarged front elevation of our combination head and gauge; Fig. 12 is a side elevation thereof partially in section; Fig. 13 is a vertical section through the lamp base and chuck therefor; Fig. 14 is a top plan of the combination head and gauge; and Fig. 15 is an elevation of a completed lamp.

Referring to the drawings, and more particlarly to Figs. 1 and 2, the machine as a whole is carried by a base or table 10 which has mounted thereon a housing 11 secured to the table by means of the bolts 12. Centrally located in the housing 11 is a gear 13 which has extending therefrom and keyed thereto a hollow shaft 14 which carries an upper and a lower turret 15 and 16 supported by means of the spiders 17 and 18 which extend from the hubs 19 and 20 mounted on the said shaft. The turrets are continuously rotated by means of the gear 13 and worm 21 which is mounted on shaft 22 and driven from an outside source such as a motor (not shown) through the pulleys 23 and belt 24. The upper turret 15 carries a plurality of chucks 25, each of which is adapted to receive a lamp base. The lower turret 16 comprises a plurality of bearings 26 which have slidably mounted therein the rods 27 each carrying at its upper end a head 28 and each provided with a spring 29 acting to press the rod and head carried thereby upwardly. The number of holders each comprising a chuck 25 and a head 28 corresponding thereto may be varied as desired. In the present instance we have shown twenty of each. A vertical rod 30 attached to one of the arms of the upper spider 17 (Fig. 2) slides through a corresponding arm in the lower spider 18 so as to insure proper registration of the chucks 25 and heads 28.

The exhausted, sealed, and unbased lamps, likewise the lamp bases partially filled with cement, are delivered to the operator who is stationed at A (Fig. 1) and, prior to loading into the machine, assembles each base and hub in approximately proper relation for uniting. As shown in Fig. 3, the lamp base 31 is provided with a center contact 32 perforated so as to receive one end of the leading-in wire 33 which is threaded through the opening therein, subsequently being cut off so as not to protrude beyond the contact. The other leading-in wire 34 is then bent back along the side of the bulb.

The chuck 25 into which the lamp base 31 fits comprises a pair of fixed base pin locating members 35 and 36 provided with faces 37 and 38 (Figs. 11 and 12) located substantially in the same plane and so spaced as to contact with base pins 39 and 40 extending from the lamp base 31. The operator inserts a lamp in the machine by pressing down the disc 41 with the bulb portion 42 of the assembled lamp and then allowing the spring 29 to raise the lamp until the base 31 enters the chuck 25. At the same time the operator insures the registry of the pins 39 and 40 with the faces 37 and 38. In practice the operator learns to so insert the lamps that there is approximate registry, and by slight turning, exact registry is obtained. A seat 43 for the upper end of the base is pivotally mounted at 44 so that when pressure is applied thereto the extension 45 is caused to grip and hold the base firmly in the chuck 25 and the face 46 aligns the base vertically. It will be seen therefore, that the fixed locating members 35 and 36, and the extension 45 definitely fix the position of the base 31. The location of the lamp base in a definite position with respect to its holder enables the operator to turn the lamp bulb with reference to the base, and thus secure any desired relation between the plane of the filament and that of the base pins. As shown in the drawing, these planes are at right angles to each other but it may be desirable to have them parallel or at some other angle with each other.

We provide optical means to assist the operator in positioning the filament with reference to the base pins. Each head 28, in the specific form shown in the drawing, is provided with a separate optical means for this purpose. The said optical means comprises a lens 47 placed directly beneath an opening 48 centrally located in the disc portion 41 of the head 28 and resting on a removable support 49 which is provided with an external thread engaging the internal thread of the head. Located in each head a short distance from the lens 47 is a prism 50.

As the lamp base is placed in its chuck 25, a pin 51, which is slidably mounted in the insulated bushing 52 (Fig. 9) and held in position by means of a spring 53, enters the opening in the center contact 32 of the lamp base (Figs. 12 and 13) thereby forming an electrical connection with the leading-in wires 33 causing the filament 54 to be lighted. Current is supplied for this purpose from a suitable source (not shown) through the conduit 55 (Figs. 4, 5 and 6) which is connected to a circular plate 56 through a terminal 57. The path of the current from the plate 56 is through the contact member 57 carried by the bushing 52, conductor 58, pin 51, leading-in conductor 33, and filament 54, and out through the leading-in conductor 34 to the machine which is grounded. The circular plate 56 extends part way around the machine being supported by means of the member 59 and held in position by the spring-pressed pins 60 extending from and slidably mounted in the member 59. The said member is carried by the arms 61 and 62 and is insulated therefrom by means of insulators 63, one of which is shown in Fig. 6.

In operation, when the lamp is lighted an end-on projection of the filament appears somewhat magnified as the image 65 on the translucent screen 64 which forms one face of the prism 50. The operator adjusts the bulb until the center of the image of the filament lies at the intersection of the cross hairs provided on the screen 64, as shown in Fig. 11. Any desired relation between filament and base pin planes may be secured by rotating the bulb. As shown, the location of the image on the vertical cross-hair indicates that the plane of the filament is at right angles to that of the base pins. If it were located on the horizontal cross-hair, it would indicate the filament plane to be parallel with that of the base pins. Intermediate locations of the image would indicate various angular relations between these planes. The horizontal cross-hair corresponds to a line extending parallel to the plane containing the faces 37 and 38 and passing through the centers of base pins 39 and 40 when the base is properly positioned in the chuck 25. The vertical cross-hair corresponds to a line extending transversely of the aforesaid line and passing through the axis of the chuck 25 and head 28 and, therefore, of the base 31 when it is inserted in the said chuck. When, as shown in the drawing, the position of the bulb is adjusted to bring the image of the filament on the vertical cross-hair with the center of the image at the intersection of the vertical and horizontal cross-hairs, the subsequent union of the base to the bulb produces a lamp which may be placed in a suitable socket with definite locating of filament in the light projection system.

The adjusted lamps move slowly in the direction of the arrow (Fig. 1) toward a heater 66 which is circular in shape and extends part way around the machine. The heater 66 is supported by means of the spider arms 62 which extend from a hub 67 mounted on a stationary shaft 68 extending from a sleeve 69 forming part of the housing 11. Heat is applied to the lamp bases by the circular gas burners 70 and 71 which receive their supply of gas and air from a source (not shown) through the pipe 72. As the lamps pass through the heater 66, the cementing compound contained in each base becomes quite hard so as to firmly unite each base and bulb. The lamps pass out of the heater through a cooling zone where cold air is applied to the bases from the pipes 73 and 74 which are supported by means of the spider arms 61 extending from a hub 75 mounted on the shaft 68. Air is supplied to the pipes 73 and 74 through the pipe 76. The lamps continue to move toward the operator where they again light up for the purpose of inspection prior to being removed. As the lamps are taken from the machine the operator cuts off that portion of the side leading-in wire 34 which protrudes from the base, applying a drop of solder so as to unite the wire 34 to the base, and also applying solder in the opening in the center contact 32, thus uniting the leading-in wire 33 to the contact, the result being a completed lamp as shown in Fig. 15.

One of the advantages of our machine arises from the provision of a separate screen for each lamp. The image of the filament on the screen is exhibited to the operator continuously as the lamp travels from the loading position to the heater and therefore allows ample opportunity for lamp adjustment and correction if a mistake is made in the first adjustment. Errors due to parallax are also avoided since opportunity is given to obtain the proper angle of vision.

What we claim as new and desire to secure by Letters Patent of the United States is:

1. In a machine for basing electric incandescent lamps and other devices comprising a filament or other translating body, the combination of a holder for receiving an assembly comprising a base, and a bulb containing said translating body, means for uniting said base to said bulb, means for moving said holder to said base uniting means, and means for indicating the position of said translating body with reference to said base before said assembly reaches said uniting means.

2. In a machine for basing electric incandescent lamps and other devices comprising a filament or other translating body, the combination of a series of holders each adapted to receive an assembly comprising a base, and a bulb containing said translating body, means for uniting said bases to said bulbs, means for moving said holders to said uniting means, and means for indicating the position of each translating body with reference to its base before said assembly reaches said uniting means.

3. In a machine for basing electric incandescent lamps and other devices comprising a filament or other translating body, the combination of a series of holders each adapted to receive an assembly comprising a base, and a bulb containing said translating body, means for uniting said bases to said bulbs, means for moving said holders to said uniting means, and an indicating means for each holder for showing the position of each translating body with reference to its base before said assembly reaches said uniting means.

4. In a machine for basing electric incandescent lamps and other devices comprising a filament or other translating body, the combination of a holder consisting of a chuck for receiving the base and a head for engaging the bulb portion of the assembly, means mounted in operative relation to said head for indicating the position of the translating body with reference to the base, means for uniting said base to said bulb, and means for moving said holder to said uniting means.

5. In a machine for basing electric incandescent lamps and other devices comprising a filament or other translating body, the combination of a holder consisting of a chuck for receiving the base and a head for engaging the bulb portion of the assembly, optical means mounted in operative relation to said head for indicating the position of the translating body with reference to the base, means for uniting said base to said bulb, and means for moving said holder to said uniting means.

6. In a machine for basing electric incandescent lamps and other devices comprising a filament or other translating body, the combination of a series of holders each consisting of a chuck for receiving the base and a head for engaging the bulb portion of the assembly, means mounted in operative relation to said head for indicating the position of each translating body with reference to its base, means for uniting said bases to said bulbs, and means for moving said series of holders to said uniting means.

7. In a machine for basing electric incandescent lamps and other devices comprising a filament or other translating body, the combination of a series of holders each consisting of a chuck for receiving the base and a head for engaging the bulb portion of the assembly, optical means mounted in operative relation to said head for indicating the position of each translating body with reference to its base, means for uniting said bases to said bulbs, and means for moving said series of holders to said uniting means.

8. In a machine for basing electric incandescent lamps and other devices comprising a filament or other translating body, the combination of a holder consisting of a chuck for receiving the base and a head for engaging the bulb portion of the assembly, a screen and means comprised in said head for projecting an image of the filament or other translating body on said screen, means for uniting said base to said bulb, and means for moving said holder to said uniting means.

9. In a machine for basing electric incandescent lamps and other devices comprising a filament or other translating body, the combination of a holder consisting of a chuck for receiving the base and a head for engaging the bulb portion of the assembly, a screen carried by said head and means comprised in said head for projecting an image of the filament or other translating body on said screen, means for uniting said base to said bulb, and means for moving said holder to said uniting means.

10. In a machine for basing electric incandescent lamps and other devices comprising a filament or other translating body, the combination of a holder consisting of a chuck for receiving the base and a head for engaging the bulb portion of the assembly, a screen carried by said head and lenses also carried thereby for projecting an image of the filament or other translating body on said screen, means for uniting said base to said bulb, and means for moving said holder to said uniting means.

11. In a machine for basing electric incandescent lamps and other devices comprising a filament or other translating body, the combination of a holder consisting of a chuck for receiving the base and a head for engaging the bulb portion of the assembly, a screen carried by said head and lenses also carried thereby for projecting an image of the filament or other translating body on said screen, means for lighting up the filament or other translating body, means for uniting said base to said bulb, and means for moving said holder to said uniting means.

12. In a machine for basing electric incandescent lamps and other devices comprising a filament or other translating body, the combination of a series of holders each consisting of a chuck for receiving the base and a head for engaging the bulb portion of the assembly, means mounted in operative relation to said head for indicating the position of the translating body with reference to its base, means for uniting said bases to said bulbs, and means for rotating said series into operative relation to said uniting means.

13. In a machine for basing electric incandescent lamps and other devices comprising a filament or other translating body, the combination of a series of holders each consisting of a chuck for receiving the base and a head for engaging the bulb portion of the assembly, optical means mounted in operative relation to said head for indicating the position of the translating body with reference to its base, means for uniting said bases to said bulbs, and means for rotating said series into operative relation to said uniting means.

14. In a machine for basing electric incandescent lamps and other devices comprising a filament or other translating body, the combination of a series of holders each consisting of a chuck for receiving the base and a head for engaging the bulb portion of the assembly, a screen and means comprised in said head for projecting an image of the filament or other translating body on said screen, means for uniting said bases to said bulbs, and means for rotating said series into operative relation to said uniting means.

15. In a machine for basing electric incandescent lamps and other devices comprising a filament or other translating body, the combination of a series of holders each consisting of a chuck for receiving the base and a head for engaging the bulb portion of the assembly, a screen carried by said head and means comprised in said head for projecting an image of the filament or other translating body on said screen, means for uniting said bases to said bulbs, and means for rotating said series into operative relation to said uniting means.

16. In a machine for basing electric incandescent lamps and other devices comprising a filament or other translating body, the combination of a series of holders each consisting of a chuck for receiving the base and a head for engaging the bulb portion of the assembly, a screen carried by said head and lenses also carried thereby for projecting an image of the filament or other translating body on said screen, means for uniting said bases to said bulbs, and means for rotating said series into operative relation to said uniting means.

17. In a machine for basing electric incandescent lamps and other devices comprising a filament or other translating body, the combination of a series of holders each consisting of a chuck for receiving the base and a head for engaging the bulb portion of the assembly, a screen carried by said head and lenses also carried thereby for projecting an image of the filament or other translating body on said screen, means for lighting up the filament or other translating body, means for uniting said bases to said bulbs, and means for rotating said series into operative relation to said uniting means.

In witness whereof THOMAS O. MOFFIT has hereunto set his hand this 16th day of February, 1926, and REGINALD K. BRAUNSDORFF has hereunto set his hand this 8th day of February, 1926.

THOMAS O. MOFFIT.
REGINALD K. BRAUNSDORFF.

CERTIFICATE OF CORRECTION.

Patent No. 1,687,504.  Granted October 16, 1928, to

THOMAS O. MOFFIT ET AL.

It is hereby certified that error appears in the printed specification of the above numbered patent requiring correction as follows: Page 2, line 27, for the word "hub" read "bulb"; and that the said Letters Patent should be read with this correction therein that the same may conform to the record of the case in the Patent Office.

Signed and sealed this 11th day of December, A. D. 1928.

(Seal)

M. J. Moore,
Acting Commissioner of Patents.

the combination of a series of holders each consisting of a chuck for receiving the base and a head for engaging the bulb portion of the assembly, a screen carried by said head and lenses also carried thereby for projecting an image of the filament or other translating body on said screen, means for lighting up the filament or other translating body, means for uniting said bases to said bulbs, and means for rotating said series into operative relation to said uniting means.

In witness whereof THOMAS O. MOFFIT has hereunto set his hand this 16th day of February, 1926, and REGINALD K. BRAUNSDORFF has hereunto set his hand this 8th day of February, 1926.

THOMAS O. MOFFIT.
REGINALD K. BRAUNSDORFF.

CERTIFICATE OF CORRECTION.

Patent No. 1,687,504.          Granted October 16, 1928, to

THOMAS O. MOFFIT ET AL.

It is hereby certified that error appears in the printed specification of the above numbered patent requiring correction as follows: Page 2, line 27, for the word "hub" read "bulb"; and that the said Letters Patent should be read with this correction therein that the same may conform to the record of the case in the Patent Office.

Signed and sealed this 11th day of December, A. D. 1928.

M. J. Moore,
(Seal)                                Acting Commissioner of Patents.